(12) United States Patent
Chang et al.

(10) Patent No.: US 12,235,528 B2
(45) Date of Patent: Feb. 25, 2025

(54) CHOLESTERIC LIQUID CRYSTAL DISPLAY DEVICE, CONTROL SYSTEM, AND CONTROL METHOD THEREOF

(71) Applicant: IRIS OPTRONICS CO., LTD., Tainan (TW)

(72) Inventors: Chung-Yi Chang, Tainan (TW); Chi-Chang Liao, Tainan (TW)

(73) Assignee: IRIS OPTRONICS CO., LTD., Tainan (TW)

( * ) Notice: Subject to any disclaimer, the term of this patent is extended or adjusted under 35 U.S.C. 154(b) by 0 days.

(21) Appl. No.: 18/226,250

(22) Filed: Jul. 25, 2023

(65) Prior Publication Data
US 2024/0411165 A1    Dec. 12, 2024

(30) Foreign Application Priority Data

Jun. 9, 2023    (TW) ................. 112121678

(51) Int. Cl.
| | | |
|---|---|---|
| *G02F 1/133* | (2006.01) | |
| *G02F 1/137* | (2006.01) | |
| *H02S 40/34* | (2014.01) | |
| *H02S 40/38* | (2014.01) | |

(52) U.S. Cl.
CPC ...... *G02F 1/13324* (2021.01); *G02F 1/13718* (2013.01); *H02S 40/34* (2014.12); *H02S 40/38* (2014.12)

(58) Field of Classification Search
CPC .. G02F 1/13324; G02F 1/13718; H02S 40/34; H02S 40/38
See application file for complete search history.

(56) References Cited

U.S. PATENT DOCUMENTS 6,518,944 B1 *    2/2003  Doane ................. G02F 1/13318
                                                              345/87
2012/0146965 A1 *  6/2012  Baek ...................... G09G 3/006
                                                             345/204

* cited by examiner

*Primary Examiner* — Thoi V Duong
(74) *Attorney, Agent, or Firm* — Cheng-Ju Chiang

(57) ABSTRACT

The present invention relates to a cholesteric liquid crystal display device, and a control method. The cholesteric liquid crystal display device includes a cholesteric liquid crystal display module, a solar battery unit, and a control unit. The control unit further includes an ambient energy management module and an energy storage module. The solar battery unit provides electrical energy to the management module. And the ambient energy management module stores electrical energy in the energy storage module. When it is necessary to refresh the images of the cholesteric liquid crystal display module, and the potential difference of the energy storage module reaches the charging cut-off voltage. The energy storage module can discharge the stored electrical energy to provide the electrical energy required by the cholesteric liquid crystal display module to refresh the image.

14 Claims, 4 Drawing Sheets

 S01 Electrical energy is supplied to the solar battery unit into via the management module

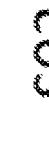 S02 The electrical energy is stored in the energy storage module through the management module.

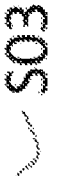 S03 When it is necessary to refresh the display image and the voltage difference of the energy storage module reaches the charging cut-off voltage, the energy storage module will discharge electrical energy to power the cholesteric liquid crystal display unit

 S04 The electrical energy is supplied to the cholesteric liquid crystal display unit in order to refresh the display image.

Fig. 4

CHOLESTERIC LIQUID CRYSTAL DISPLAY DEVICE, CONTROL SYSTEM, AND CONTROL METHOD THEREOF

BACKGROUND OF THE INVENTION

1. Field of the Invention

The present invention relates to a cholesteric liquid crystal display device and control system, particularly a cholesteric liquid crystal display device and control system that utilizes an energy storage module such as a supercapacitor for energy storage and power supply.

2. Description of Related Art

Cholesteric liquid crystal display devices have the bi-stable characteristic and consume electrical energy to refresh the images, and almost do not consume electrical energy after the image refresh process is completed. Thus, a cholesteric liquid crystal display device is suitable for using ambient energy as a power source in conjunction with an energy storage device. For instance, sunlight and the energy storage device are used to power the cholesteric liquid crystal display devices.

Energy storage devices typically refer to batteries, including disposable and rechargeable types. However, both types have a limited lifespan and require regular maintenance and replacement, resulting in additional costs. Moreover, batteries consume a significant amount of precious raw metal materials during the manufacturing process, which substantially impacts on the environment from mining to processing. Even worse, the replacement of batteries further exacerbates environmental issues.

On the other hand, the energy storage module has several advantages over conventional capacitors and batteries. They have a much higher capacitance density, which allows them to store many charges, and a solid high-current discharge capability, making them ideal for devices that require short-term high-power output. Compared to batteries, the energy storage module has a longer cycle life because their electrochemical reaction rate is slower, and they do not need to be replaced as frequently. Additionally, the energy storage module has the benefit of fast charging and discharging, which means it can provide power immediately. Furthermore, the capacitance and internal resistance of the energy storage module vary only slightly with temperature, allowing them to perform consistently across a wide operating temperature range.

Therefore, the energy storage module is ideal for cholesteric liquid crystal display devices and can effectively reduce costs while avoiding the environmental impact caused by disposable or rechargeable batteries. To overcome the disadvantages above, a solution is necessary.

SUMMARY OF THE INVENTION

The present invention provides a cholesteric liquid crystal display device, and control method thereof. When the cholesteric liquid crystal display device is not refreshing images, the ambient energy management module receives electrical energy from the solar battery unit and stores it in the energy storage module. When images need to be refreshed, the energy storage module discharges electrical energy to power the cholesteric liquid crystal display device, creating a self-powered supply system.

The present invention provides a cholesteric liquid crystal display device that consists of a cholesteric liquid crystal display unit, a solar battery unit, and a control unit.

The cholesteric liquid crystal display unit is composed of a light-incident surface, which receives external light to refresh the display image by utilizing electrical energy from a solar battery unit. The solar battery unit consists of a light-receiving surface attached to the surface of the cholesteric liquid crystal display unit and positioned away from the light-incident surface. The light-receiving surface can convert a portion of the external light penetrating the cholesteric liquid crystal display unit into electrical energy. The control unit includes an ambient energy management module, which is electrically connected to the solar battery unit, and an energy storage module, which is electrically connected to both the ambient energy management module and the cholesteric liquid crystal display unit. The ambient energy management module may be an ambient energy manager chip and is responsible for managing the electrical energy. The electrical energy generated by the solar battery unit is stored in the energy storage module through the ambient energy management module. This stored electrical energy powers the cholesteric liquid crystal display unit. When the cholesteric liquid crystal display unit requires refreshing the display image, and the potential difference of the energy storage module reaches a charging cut-off voltage, the energy storage module discharges the stored electrical energy to the cholesteric liquid crystal display unit, thus refreshing the display image.

The energy storage module can be a device such as a super capacitor or a capacitor, and it is equipped with a charging cut-off voltage (Vovch).

The control system consists of a main control module and a timing control module. The main control module is electrically connected to the ambient energy management module and the energy storage module. Similarly, the timing control module is electrically connected to the main control module and the cholesteric liquid crystal display unit. This means that the ambient energy management module is connected to the main control module, and the energy storage module is also connected to the main control module. Furthermore, the main control module is connected to the timing control module, and the timing control module is connected to the cholesteric liquid crystal display unit. When the display image of the cholesteric liquid crystal display unit needs to be refreshed and, the voltage difference of the energy storage module reaches the charging cut-off voltage, the ambient energy management module sends a power supply signal to the main control module. As a result, the energy storage module discharges the stored electrical energy to the main control module. This allows the main control module to continuously supply electrical energy to the timing control module, which in turn continuously provides electrical energy to the cholesteric liquid crystal display unit for refreshing the display image.

The main control module further comprises a processing module and a first power management module. The processing module is electrically connected to the first power management module. The timing control module further comprises a timing controller, a DC-to-DC converter, and a second power management module electrically connected to the DC-to-DC converter. The timing controller is electrically connected to the second power management module, and the DC-to-DC converter is also electrically connected to the second power management module.

When it is necessary to refresh the display images on the cholesteric liquid crystal display unit, and the voltage difference of the energy storage module receives the electrical energy from the solar battery unit and reaches the charging cut-off voltage, the ambient energy management module sends a power supply signal to activate the first power management module. The energy storage module then discharges the stored electrical energy to the first power management module, and then continuously supplies electrical energy to the second power management module through a DC-to-DC converter for the cholesteric liquid crystal display unit to refresh the display images. Besides, the processing module sends the display images to be refreshed to the timing controller and puts through the display images to the cholesteric liquid crystal display unit.

The charging cut-off voltage can be set in the range of 4 volts to 4.1 volts. Once the voltage difference of the energy storage module reaches this range, the ambient energy management module can send a power supply signal to the main control module. At the same time, the energy storage module can discharge the stored electrical energy to the main control module. The main control module then continuously supplies electrical energy to the timing control module, which in turn provides electrical energy to the cholesteric liquid crystal display unit for refreshing the display image.

In addition, the main control module also includes a built-in or plug-in data register storage area. The data register storage area receives at least one image data from an electronic device in one of two ways: wirelessly or through a wired connection. This image data is then transmitted to the timing controller and displayed on the cholesteric liquid crystal display unit.

Furthermore, the present invention also provides a control system for a cholesteric liquid crystal display device. This control system is used to manage electrical energy supply of the cholesteric liquid crystal display device. The cholesteric liquid crystal display device of the present invention comprises a cholesteric liquid crystal display unit and a solar battery unit that is attached to the surface of the cholesteric liquid crystal display unit and positioned away from the light-incident surface. In addition, the control system for the cholesteric liquid crystal display device comprises an ambient energy management module, a supercapacitor, a main control module, and a timing control module.

The ambient energy management module is electrically connected to the solar battery unit and is used to receive electrical energy from the solar battery unit. The supercapacitor is electrically connected to the ambient energy management module and is used to receive and store electrical energy from the ambient energy management module. Additionally, the supercapacitor has a charging cut-off voltage. The main control module is electrically connected to both the ambient energy management module and the supercapacitor, and the timing control module is electrically connected to the main control module and the cholesteric liquid crystal display unit, respectively.

When the cholesteric liquid crystal display unit needs to refresh the display image and the voltage difference of the supercapacitor reaches the charging cut-off voltage, the ambient energy management module sends a power supply signal to activate the main control module. The supercapacitor discharges its stored electrical energy to the main control module, and the main control module then continuously provides electrical energy to the timing control module for the cholesteric liquid crystal display module to refresh the display image. The main control module further comprises a processing module and a first power management module, with the processing module being electrically connected to the first power management module. The timing control module further comprises a timing controller, a DC-to-DC converter electrically connected to the main control module, and a second power management module electrically connected to both the timing control module and the DC-DC converter.

The charging cut-off voltage of the supercapacitor can be set within the range of 4 volts to 4.1 volts. When the cholesteric liquid crystal display unit needs to refresh the display image, and the voltage difference of the supercapacitor reaches this range, the ambient energy management module sends a power supply signal to the main control module to activate the first power management module, causing the supercapacitor to discharge its stored electrical energy to the first power management module. The supercapacitor then continuously provides electrical energy to the second power management module through the DC-DC converter for the cholesteric liquid crystal display module to refresh the display image. Additionally, the processing module sends the images to be refreshed to the timing controller for the cholesteric liquid crystal display module to refresh the display image.

Therefore, the present invention provides a cholesteric liquid crystal display device, and control method thereof. The management module only needs to receive electrical energy provided by the solar battery unit and store electrical energy in the supercapacitor when the cholesteric liquid crystal display device does not need to refresh the display image. When the display image needs to be refreshed, the supercapacitor can discharge electrical energy to the cholesteric liquid crystal display unit to refresh the display image, forming a self-sufficient display power supply system.

The aforementioned illustrations are exemplary for the purpose of further explaining the scope of the present invention. Other objectives and advantages related to the present invention will be illustrated in the subsequent descriptions and appended drawings.

BRIEF DESCRIPTION OF THE DRAWINGS

The foregoing features may be combined with the following drawings in various combinations without exclusivity, unless expressly indicated otherwise. Apparently, descriptions of drawings in the following may be some of embodiments of the present invention, those of ordinary skill in the art may derive other drawings based on the following drawings without unduly experiments.

FIG. 4 is a flowchart of a control method of a cholesteric liquid crystal display device according to the present invention.

DETAILED DESCRIPTION OF THE PREFERRED EMBODIMENTS

The aforementioned constructions and associated functions and the following detailed descriptions are exemplary for the purpose of further explaining the scope of the present invention. Other objectives and advantages related to the present invention will be illustrated in the subsequent descriptions and appended drawings. Furthermore, the present invention may be embodied in various modifications, and descriptions and illustrations are not-limiting.

Figure 1:
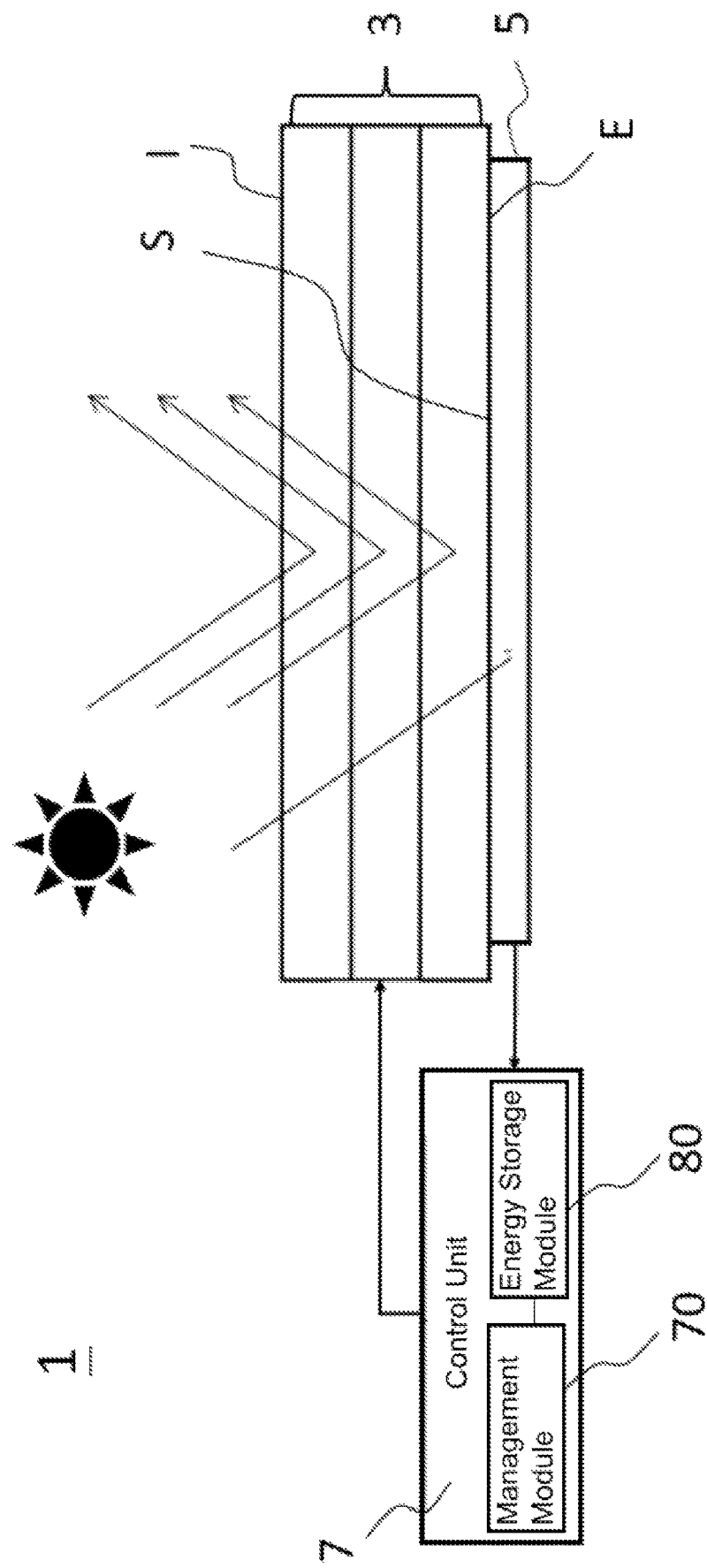
FIG. 1 is a schematic diagram of a cholesteric liquid crystal display device of the present invention.

The present invention relates to a cholesteric liquid crystal display device, as well as a control system. Please refer to FIG. 1, illustrating a schematic diagram of the cholesteric liquid crystal display device 1. As depicted in FIG. 1, the cholesteric liquid crystal display device 1 is composed of a cholesteric liquid crystal display unit 3, a solar battery unit 5, and a control unit 7. The cholesteric liquid crystal display device 1 operates by receiving ambient light from the environment, which penetrates the cholesteric liquid crystal display unit 3. The solar battery unit 5 then receives and converts light beams into electrical energy from the ambient light. Moreover, a portion of the ambient light will reflect the image displayed on the cholesteric liquid crystal display unit 3, which can be seen by the viewers' eyes.

The cholesteric liquid crystal display unit 3 comprises a light-incident surface 1 and receives electrical energy to refresh the display image. The required electrical energy for this process is provided by the solar battery unit 5. The solar battery unit 5 includes a light-receiving surface E attached to the surface S of the cholesteric liquid crystal display unit 3, and positioned away from the light-incident surface 1. The light-receiving surface E converts a portion of the ambient light beams that passes through the cholesteric liquid crystal display unit 3, starting from the light incident surface 1, into electrical energy. The control unit 7 consists of an ambient energy management module 70 and an energy storage module 80. The ambient energy management module 70, which may be an ambient energy manager chip, is responsible for managing the electrical energy, and is electrically connected to both the solar battery unit 5 and the energy storage module 80. The energy storage module 80 is a supercapacitor with a charging cut-off voltage (Vovch).

Figure 2:
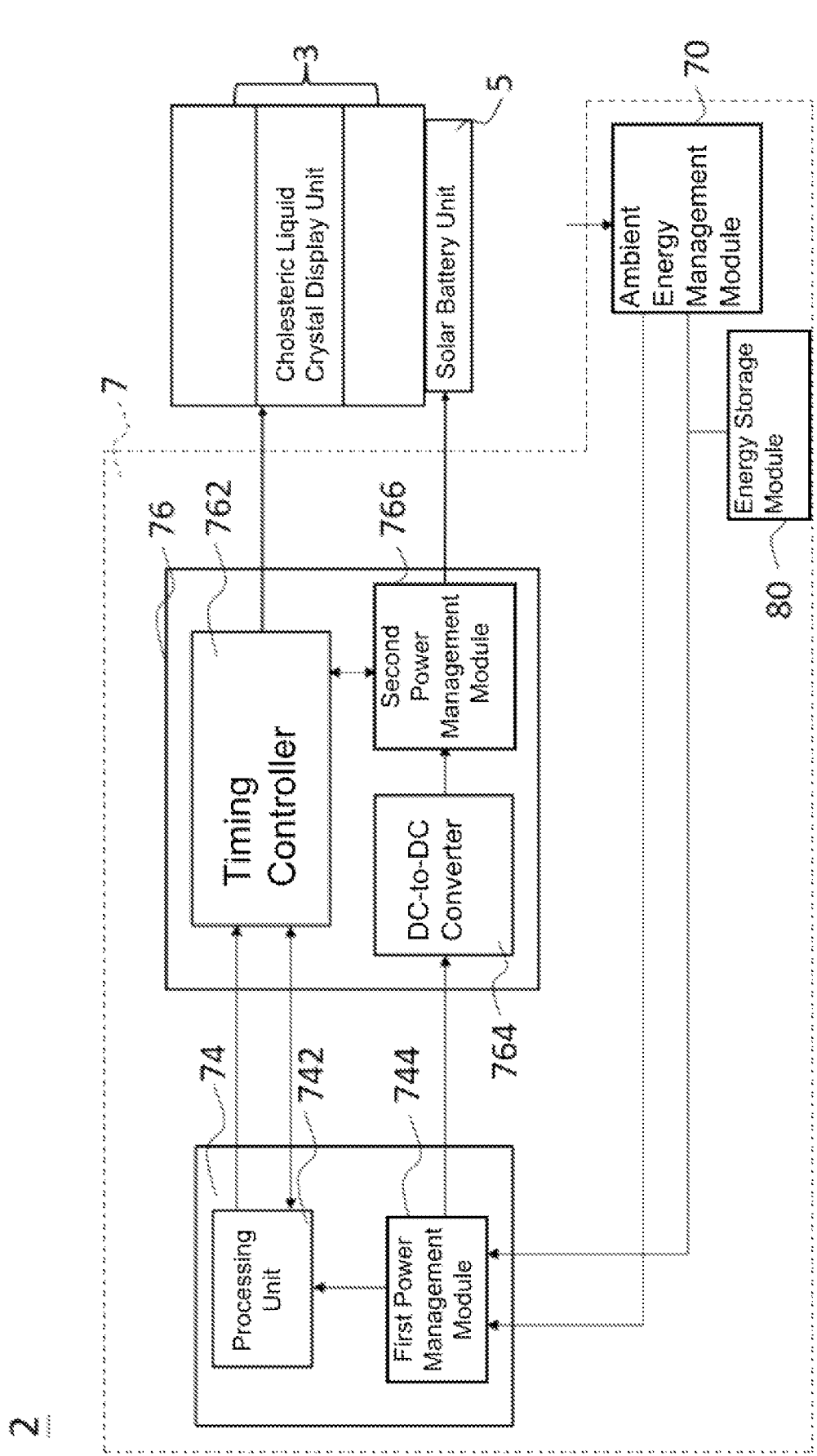
FIG. 2 is a schematic diagram of a control system of a cholesteric liquid crystal display device according to the present invention.

Please refer to FIG. 1 in conjunction with FIG. 2. FIG. 2 illustrates a schematic diagram of a control system of a cholesteric liquid crystal display device according to the present invention. Referring to the control system 2, the solar battery unit 5 receives light beams to generate electrical energy so as to power the ambient energy management module of the ambient energy management module 70, and the ambient energy management module 70 may store the electrical energy in the energy storage module 80. When it is necessary to refresh the display image on the cholesteric liquid crystal display unit 3, and the voltage difference of the supercapacitor reaches the charging cut-off voltage, the supercapacitor may discharge the stored electrical energy to the cholesteric liquid crystal display unit 3, thereby refreshing the display image.

The control unit 7 comprises a main control module 74 and a timing control module 76. The main control module 74 includes a processing module 742 and a first power management module 744. The processing module 742 is electrically connected to the first power management module 744. The first terminal of the ambient energy management module 70 is connected to the solar battery unit 5, and the second terminal is electrically connected to the supercapacitor. The third terminal of the ambient energy management module 70 is connected to the first power management module 744 of the main control module 74. Moreover, the supercapacitor is also electrically connected to the first power management module 744 of the main control module 74, and the main control module 74 is electrically connected to the timing control module 76. The timing control module 76 is responsible for controlling the cholesteric liquid crystal display unit 3. When it is necessary to refresh the display image on the cholesteric liquid crystal display unit 3, and the voltage difference of the supercapacitor reaches the charging cut-off voltage, the ambient energy management module 70 sends a power supply signal to the first power management module 744 of the main control module 74. Subsequently, the supercapacitor discharges the stored electrical energy to the first power management module 744 of the main control module 74. The main control module 74 can continuously provide electrical energy to the timing control module 76, which, in turn, continuously supply electrical energy to the cholesteric liquid crystal display unit 3 for refreshing the display image.

Furthermore, the timing control module 76 further comprises a timing controller 762, a DC-to-DC converter 764, and a second power management module 766, and the timing controller 762 is electrically coupled to the second power management module 766, and the DC-to-DC converter 764 is also electrically coupled to the second power management module 766. When it is necessary to refresh the display image of the cholesteric liquid crystal display unit 3, and the voltage difference of the supercapacitor reaches the charging cut-off voltage, the ambient energy management module 70 will send the power supply signal to the first power management module 744, and the supercapacitor will discharge the stored electrical energy to the first power management module 744. The processing module 742 can continuously send a low-voltage differential signals (LVDS) and serial peripheral interface (SPI) signals, or only send serial peripheral interface (SPI) signals, to the timing controller 762 so as to continuously provide the display image. The first power management module 744 continuously supplies electrical energy to the second power management module 766 through the DC-to-DC converter 764, and the timing controller 762 continuously provides the electrical energy required for the cholesteric liquid crystal display unit 3 to refresh the display image. At the same time, the second power management module 766 provides the electrical energy required by the cholesteric liquid crystal display unit 3 to refresh the display image.

The charging cut-off voltage may be set within the range of 4 volts to 4.1 volts. When the voltage difference of the supercapacitor reaches the range of 4 volts to 4.1 volts, the ambient energy management module 70 can send the power supply signal to the main control module 74. At the same time, the supercapacitor discharges the stored electrical energy to the main control module 74, while the main control module 74 continuously supplies electrical energy to the timing control module 76. In turn, the timing control module 76 continuously provides electrical energy to the cholesteric liquid crystal display unit 3 for refreshing the display image.

Taking a 7.9-inch silicon-based self-powered display as an example, under an illumination of 6000-7000 lux, a supercapacitor with a capacity of 4 F (farad) can be charged from 3.6V to 4.1V in about 5 minutes. Additionally, the time taken to refresh the display image is approximately 6-7 seconds. During the display image refreshing period, the voltage of the supercapacitor is decreased from 4.1V to 3.6V because of discharging. Once the display image refreshing period is completed, the main control module 74 cuts off the power supply to the timing control module 76, and the main control module 74 enters the standby or dormant state.

Figure 3:
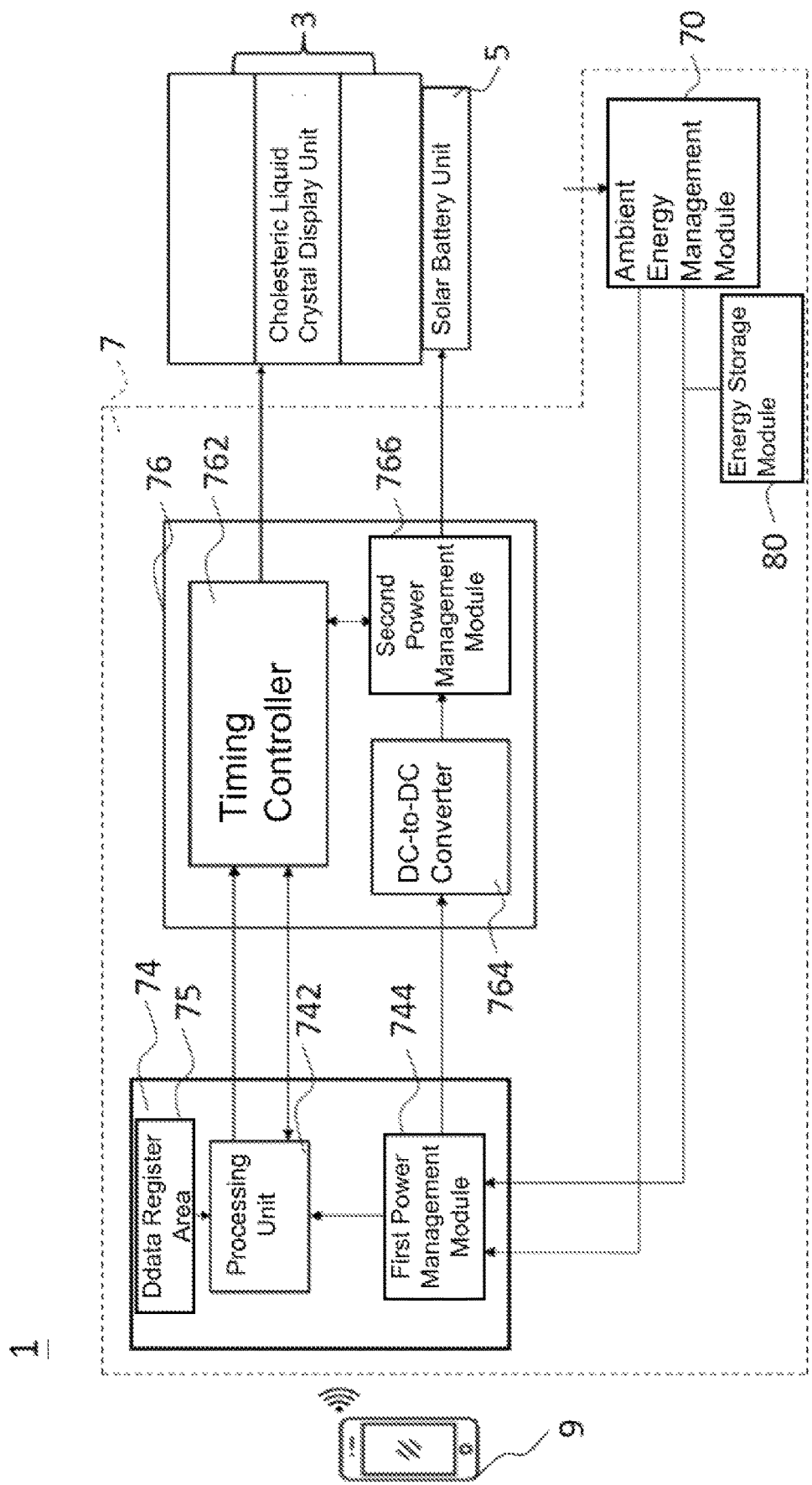
FIG. 3 is a schematic diagram of a cholesteric liquid crystal display device for receiving wireless communication according to the present invention.

Please refer to FIG. 3, which depicts a schematic diagram of the cholesteric liquid crystal display device in the present invention when receiving wireless communication. In a preferred embodiment, the cholesteric liquid crystal display device 1 comprises a cholesteric liquid crystal display unit 3, a solar battery unit 5, and a control unit 7. The control unit 7 further includes an ambient energy management module 70 and an energy storage module 80. The ambient energy management module 70 serves as an ambient energy management chip responsible for managing the electrical energy, and is electrically connected to the solar battery unit 5, which, in turn, is electrically connected to the energy storage module 80. The energy storage module 80 incorporates a supercapacitor with a charging cut-off voltage.

The control unit 7 further consists of a main control module 74 and a timing control module 76. The main control module 74 includes a built-in or external data register area 75, a processing module 742, and a first power management module 744. The timing control module 76 further comprises a timing controller 762, a DC-to-DC converter 764, and a second power management module 766. The data register area 75 receives at least one image data from an electronic device 9 through either wireless or wired connection means, and then transmits the image data to the timing controller 762 via the processing module 742 for displaying image on the cholesteric liquid crystal display unit 3. The processing module 742 is electrically connected to the first power management module 744, while the timing controller 762 is connected to the second power management module 766. The DC-to-DC converter 764 is also connected to the second power management module 766.

When the electronic device 9 has wireless communication functionality, such as a smartphone or tablet computer, the display image data intended to be refreshed can be transmitted to the data register area 75 of the main control module 74. The data register area 75 can either be memory within the main control module 74 or external memory of the main control module 74. After the electronic device 9 with wireless communication functionality transmits the display image data to the data register area, if the display image of the cholesteric liquid crystal display unit 3 needs to be refreshed, and the voltage difference of the energy storage module 80 reaches the charging cut-off voltage, the ambient energy management module 70 will send the power supply signal 72 to the first power management module 744, and the energy storage module 80 will discharge the stored electrical energy to the first power management module 744. Then, the processing module 742 can continuously send low voltage differential signals (LVDS) and serial peripheral interface (SPI) signals respectively or just send the serial peripheral interface (SPI) signal to the timing controller 762 so as to continuously provide the display image. The first power management module 744 supplies electrical energy to the second power management module 766 through the DC-to-DC converter 764, and the timing controller 762 then continuously provides the electrical energy required for the cholesteric liquid crystal display unit 3 to refresh the display image. At the same time, the second power management module 766 provides the electrical energy required for the cholesteric liquid crystal display unit 3 to refresh the display image. In other words, the main control module 74 receives the power supply signal from the ambient energy management module 70, and the first power management module 744 of the main control module 74 will supply electrical energy to the timing control module 76. Once the timing control module 76 finishes refreshing the display image, the control unit 7 will enter the standby or dormant state.

Please refer to FIG. 4, which illustrates a control method of the cholesteric liquid crystal display device 1 of the present invention. The control method is designed for managing the electrical energy of the cholesteric liquid crystal display device 1. The cholesteric liquid crystal display device 1 is as described in the previous embodiment, and the control method consists of the following steps:

In Step S01: The solar battery unit 5 receives a portion of the ambient light beams that pass through the cholesteric liquid crystal display unit 3 in order to generate electrical energy. This electrical energy is then supplied to the ambient energy management module 70.

In Step S02: The electrical energy is stored in the energy storage module 80 through the ambient energy management module 70.

In Step S03: When it is necessary to refresh the display image on the cholesteric liquid crystal display unit 3 and the voltage difference of the energy storage module 80 reaches the charging cut-off voltage, the energy storage module 80 will discharge electrical energy in order to power the cholesteric liquid crystal display unit 3.

In Step S04: Once the energy storage module 80 has discharged its stored electrical energy, it will supply this energy to the cholesteric liquid crystal display unit 3 in order to refresh the display image.

Furthermore, when it is necessary to refresh the display image on the cholesteric liquid crystal display unit 3 and the voltage difference of the energy storage module 80 reaches the charging cut-off voltage, the ambient energy management module 70 will send the power supply signal 72 to the main control module 74. The supercapacitor 80 will then discharge its stored electrical energy to the main control module 74, which will continue to supply electrical energy to the timing control module 76. The timing control module 76, in turn, can continuously provide electrical energy to the cholesteric liquid crystal display unit 3 to refresh the display image.

Therefore, the present invention provides a cholesteric liquid crystal display device and control method thereof. When the cholesteric liquid crystal display device 1 does not need to refresh the display image, the ambient energy management module 70 only needs to receive electrical energy from the solar battery unit 5 and store it in the energy storage module 80. However, when it is necessary to refresh the display image, the energy storage module 80 can discharge its stored energy to the cholesteric liquid crystal display unit 3, allowing the display image to be refreshed and to create a self-powered display system.

The descriptions illustrated above set forth simply the preferred embodiments of the present invention; however, the characteristics of the present invention are by no means restricted thereto. All changes, alterations, or modifications conveniently considered by those skilled in the art are deemed to be encompassed within the scope of the present invention set forth by the following claims.

What is claimed is:

1. A cholesteric liquid crystal display device, comprising:
a cholesteric liquid crystal display unit, comprising a light-incident surface for receiving external light;
a solar battery unit, comprising a light-receiving surface attached to a surface of the cholesteric liquid crystal display unit, and positioned away from the light-incident surface, wherein the light-receiving surface is used to convert a portion of the external light into electrical energy; and
a control unit, comprising an ambient energy management module electrically connected to the solar battery unit, an energy storage module electrically connected to both the ambient energy management module and the cholesteric liquid crystal display unit, a main control module electrically connected to the ambient energy management module, and a timing control module electrically connected to the main control module and the cholesteric liquid crystal display unit, wherein the solar battery unit stores the electrical energy through the ambient energy management module for supplying the cholesteric liquid crystal display unit.

2. The cholesteric liquid crystal display device according to claim 1, wherein the energy storage module is a supercapacitor or an energy storage unit, and equipped with a charging cut-off voltage.

3. The cholesteric liquid crystal display device according to claim 2, wherein when the cholesteric liquid crystal display unit needs to refresh display images and the voltage difference of the energy storage module reaches the charging cut-off voltage, the ambient energy management module sends a power supply signal to the main control module, the main control module continuously supplies the electrical energy to the timing control module, which continuously provides the electrical energy to the cholesteric liquid crystal display unit so as to refresh the display images.

4. The cholesteric liquid crystal display device according to claim 2, wherein the timing control module further comprises a timing controller, a DC-to-DC converter electrically connected to the main control module, and a second power management module electrically connected to both the timing controller and the DC-to-DC converter.

5. The cholesteric liquid crystal display device according to claim 4, wherein when it is necessary to refresh display images on the cholesteric liquid crystal display unit, and the voltage difference of the energy storage module receives the electrical energy from the solar battery unit and reaches the charging cut-off voltage, the ambient energy management module sends a power supply signal to activate the first power management module, the energy storage module then discharges the electrical energy to the first power management module, and then continuously supplies the electrical energy to the second power management module through a DC-to-DC converter for the cholesteric liquid crystal display unit to refresh the display images, and wherein the processing module sends the display images to be refreshed to the timing controller and puts through the display images to the cholesteric liquid crystal display unit.

6. The cholesteric liquid crystal display device according to claim 4, wherein when it is necessary to refresh display images on the cholesteric liquid crystal display unit, and the voltage difference of the energy storage module receives the electrical energy from the solar battery unit and reaches the charging cut-off voltage, the ambient energy management module sends a power supply signal to activate the first power management module, the energy storage module then discharges the electrical energy to the first power management module, and then continuously supplies the electrical energy to the second power management module through a DC-to-DC converter for the cholesteric liquid crystal display unit to refresh the display images, and wherein the processing module sends the display images to be refreshed to the timing controller and puts through the display images to the cholesteric liquid crystal display unit.

7. The cholesteric liquid crystal display device according to claim 4, wherein the main control module further comprises a built-in or plug-in data register storage area, which receives at least one image data in wireless or wired connection means, and then transmits the image data to the timing controller for displaying the image on the cholesteric liquid crystal display unit.

8. The cholesteric liquid crystal display device according to claim 1, wherein the main control module further comprises a processing module, and a first power management module electrically connected to the processing module.

9. A control system of a cholesteric liquid crystal display device, for determining electrical energy to the cholesteric liquid crystal display device which comprises a cholesteric liquid crystal display unit, and a solar battery unit attached to a surface of the cholesteric liquid crystal display unit, and positioned away from a light-incident surface, the control systems comprising:
an ambient energy management module, electrically connected to the solar battery unit, and receiving the electrical energy from the solar battery unit; and
an energy storage module, electrically connected to the ambient energy management module and receiving the electrical energy from the ambient energy management module, wherein the energy storage module is equipped with a charging cut-off voltage;
a main control module, electrically connected to the ambient energy management module and the energy storage module respectively; and
a timing controller, electrically connected to the main control module and the cholesteric liquid crystal display unit;
wherein when the cholesteric liquid crystal display unit needs to refresh display images, and the voltage difference of the energy storage module reaches the charging cut-off voltage, the ambient energy management module sends a power supply signal to activate the main control module, continuously supplies the electrical energy to the main control module which then supplies the electrical energy to the timing controller for the cholesteric liquid crystal display unit to refresh the display images.

10. The control system according to claim 9, wherein the voltage difference of the energy storage module is in the range of 4 volts to 4.1 volts.

11. The control system according to claim 9, wherein the main control module further comprises a processing module, and a first power management module electrically connected to the processing module.

12. The control system according to claim 11, wherein when it is necessary to refresh the display images on the cholesteric liquid crystal display unit and the voltage difference of the energy storage module reaches the charging cut-off voltage, the ambient energy management module sends a power supply signal the first power management module, and the energy storage module then discharges the electrical energy to the first power management module, and then continuously supplies the electrical energy to the second power management module through a DC-to-DC converter for the cholesteric liquid crystal display unit to refresh the display images, and wherein the processing module sends the display images to be refreshed to the timing controller and puts through the display images to the cholesteric liquid crystal display unit.

13. The control system according to claim 9, wherein the timing control module further comprises a timing controller, a DC-to-DC converter electrically connected to the main control module, and a second power management module electrically connected to the timing controller and the DC-to-DC converter respectively.

14. The control system according to claim 13, wherein when it is necessary to refresh the display images on the cholesteric liquid crystal display unit and the voltage difference of the energy storage module reaches the charging cut-off voltage, the ambient energy management module sends a power supply signal the first power management module, and the energy storage module then discharges the electrical energy to the first power management module, and then continuously supplies the electrical energy to the second power management module through a DC-to-DC converter for the cholesteric liquid crystal display unit to refresh the display images, and wherein the processing module sends the display images to be refreshed to the timing controller and puts through the display images to the cholesteric liquid crystal display unit.

\* \* \* \* \*